United States Patent
Neel

[15] 3,637,399
[45] Jan. 25, 1972

[54] PROCESS FOR TREATING GRAIN

[72] Inventor: James H. Neel, 6217 Ariel, Houston, Harris County, Tex. 77036

[22] Filed: Apr. 22, 1970

[21] Appl. No.: 30,656

[52] U.S. Cl. ................................99/80 PS, 127/23, 127/28, 127/68
[51] Int. Cl. ..........................................................C13l 1/02
[58] Field of Search ....................127/67, 68, 23, 28; 99/80 R, 99/80 PS

[56] References Cited

UNITED STATES PATENTS

| | | | |
|---|---|---|---|
| 1,681,118 | 8/1928 | Jaschke | 127/67 |
| 2,358,251 | 9/1944 | Huzenlaub | 99/80 PS |
| 2,494,544 | 1/1950 | Erlich | 99/80 PS |
| 3,181,955 | 5/1965 | Altman | 99/80 PS |

OTHER PUBLICATIONS

" Starch: Chemistry and Technology," Roy L. Whister, ed .; Vol. II, 73–78, Academic Press, New York, 1967.

Primary Examiner—Morris O. Wolk
Assistant Examiner—Sidney Marantz
Attorney—Pravel, Wilson & Matthews

[57] ABSTRACT

A steeping tank is filled with grain and then with water. The water is then circulated continuously through the steeping tank and recirculated through a heating device and pump such that the temperature in the tank is controlled. When the temperature in the tank is uniform, and has reached a desired temperature, the water pump is closed and air is then pumped into the tank until it reaches a desired pressure. Water is then circulated downwardly through the vessel so that the grain will form a suitable globule and homogenize to become a solid substance. The water in the tank is then removed which simultaneously releases the pressure in the vessel and thereafter the grain is removed.

2 Claims, 1 Drawing Figure

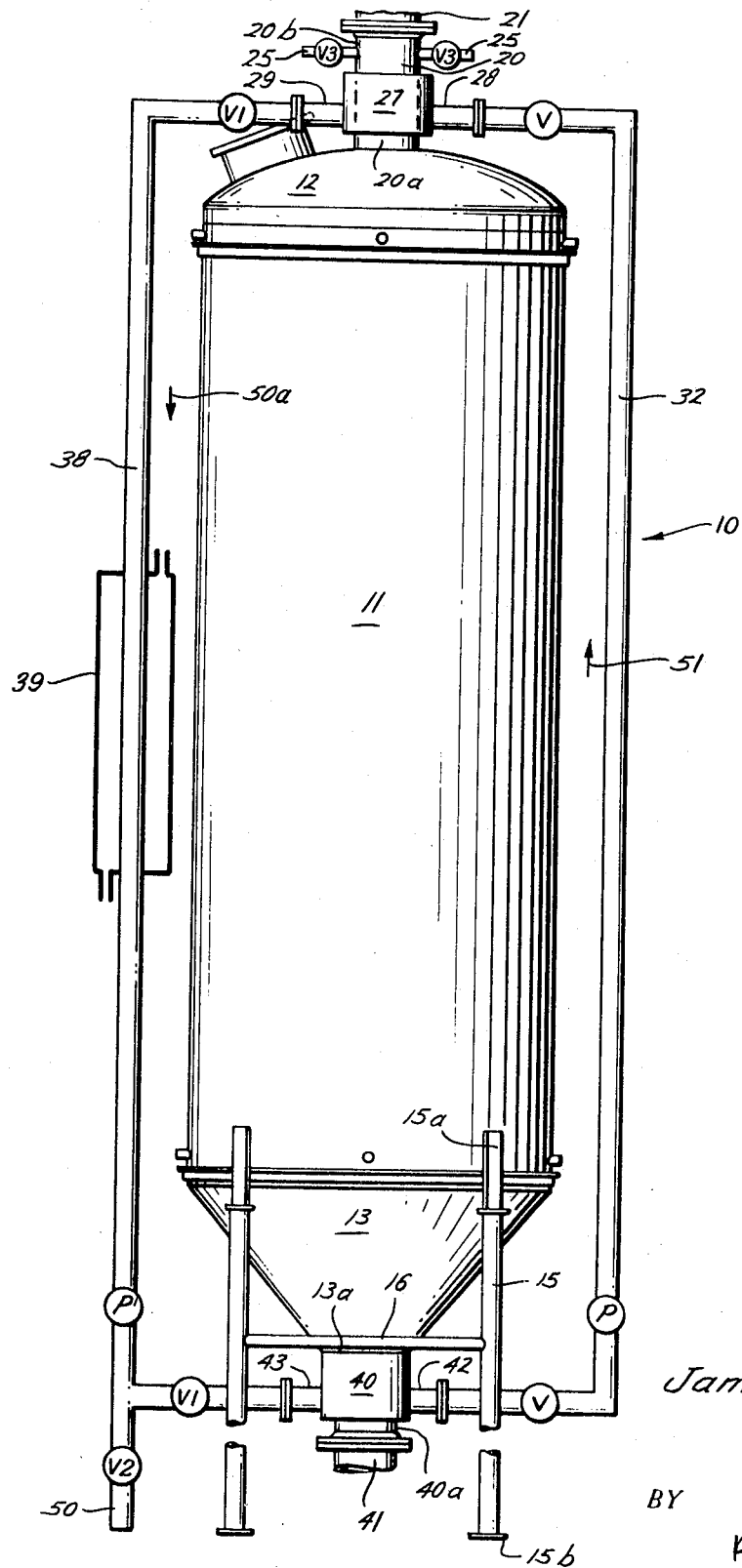

PROCESS FOR TREATING GRAIN

CROSS REFERENCES TO RELATED APPLICATIONS

This application is related to my application for "Steeping Tank," Ser. No. 30,658, which was filed Apr. 22, 1970.

BACKGROUND OF THE INVENTION

1. Field of the Invention

This invention relates to a new and improved method for treating grain.

2. Description of the Prior Art

In the prior art the treatment of grain to homogenize the starch globules or other globules required a vacuum system to be used in conjunction with the steeping tank. Of course, such vacuum system was expensive to install and required utmost care and maintenance. For example, if the vacuum was not sufficiently low, the globule formed was not a solid substance which meant that the grain might crack or break.

SUMMARY OF THE INVENTION

Briefly, the present invention relates to a new and improved method for treating grain including the steps of filling a steeping tank with rice and water, recirculating the water through the tank, heating the water until the water in the tank has risen to a desired temperature, increasing air pressure in the tank, circulating the air pressure in the tank through the water and grain, and thereafter simultaneously draining out the water and releasing the pressure so that the grain can be removed for steaming in a continuous process steam vessel.

One object of the present invention is to provide a new and improved process for treating grain. Still another object of the present invention is to provide a new and improved process for treating grain wherein the step of providing a vacuum system for the steeping tank has been eliminated.

BRIEF DESCRIPTION OF THE DRAWING

The FIGURE is an illustration of a steeping tank and its related system.

DESCRIPTION OF THE PREFERRED EMBODIMENT

As illustrated in the drawing, a steeping tank is generally designated by the numeral 10, and includes a cylindrical hollow body 11 and an inlet dome-shaped end member 12 secured at one end and a funnel-shaped outlet end member 13 secured at the other end of such cylindrical body 11. As further illustrated in the FIGURE, a plurality of vertically positioned legs 15 are welded to one end 15a to the cylindrically shaped body 11 and rest on horizontally positioned members 15b to position the steeping tank 10 in a vertical position as illustrated. As further illustrated, cross supports 16 are provided for giving added support to the legs 15.

While the operation of the steeping tank 10 may be explained in some detail, it is to be understood that the explicit details and operation of the steeping tank and its various conduits is set forth in more detail in my copending application for "Steeping Tank."

An inlet grain conduit 20 communicates with the inlet member 12 at one end 20a thereof and is provided with a suitable closure member 21 at the opposite end 20b. Of course, the closure member 21 may be of the type that is bolted on to the conduit 20 or may be suitable for threading on to the end 20b if desired.

A pair of air conduits 25 communicate with the inlet grain conduit 20 for a purpose to be set forth hereinafter.

A flow conduit 27 communicates with the grain conduit 20 and receives an inlet circulation conduit 28 and an overflow discharge conduit 29. The circulation inlet conduit 28 is secured with circulation conduit 32 which extends downwardly toward the outlet end member 13. The circulation conduit 32 is also provided with suitable valves V in each end thereof and an air circulation pump P as illustrated.

The overflow conduit 29 is secured with a suitable fluid circulation conduit 38 which extends downwardly toward the outlet end member 13, as does the circulation conduit 32. Fluid circulation conduit 38 also includes a pair of valves V1 positioned adjacent the inlet and outlet end members 12 and 13, respectively, and a pump P' for circulating fluid through the tank as will be set forth hereinafter. Also, a suitable heater device 39 is mounted with such conduit 38 for heating the fluids as they pass through such device.

The outlet member 13 is connected at its lower end 13a to an outlet grain conduit 40 which is provided with a closure member 41 connected to a head 40a of the conduit 40. Of course, the closure member 41 is adapted to be sealed and may be secured with the head 40a by any suitable means such as nuts and bolts or threadedly engaging the closure member 41 to the head 40a. An outlet circulation conduit 42 communicates with the outlet grain conduit 40 and is secured with the circulation conduit 32 as illustrated. An inlet fluid conduit 43 also communicates with the outlet grain conduit 40 and is secured by any suitable means such as nuts and bolts to the fluid circulation conduit 38 as illustrated.

As further illustrated in the FIGURE, The fluid supply and fluid drain conduit 50 is mounted with fluid circulation conduit 38 for providing a means for injecting and draining fluid from the system. It should also be noted that such conduit 50 includes a valve V2 for preventing communication between the conduits 50 and 38 if desired.

In the operation of the process, grain such as rice, for example, is poured in through the conduit 20 into the vessel 11. Water or any other suitable fluid is pumped into the tank from the conduit 50 into conduit 38 and upwardly through the outlet grain outlet 40 until the tank 11 is full. Of course, the valve V in the conduit 50 is closed as are the valves V in the conduit 32. The pump P' is then started and the water is circulated in the direction of the arrow 50a through the fluid circulation conduit 38, the heating device which raises the temperature of the water to a desired temperature level, the pump P' and through the conduit 29 for continuous recirculation until the temperature in the vessel is uniform throughout the vessel and has reached the desired level. For example, in using rice as the grain, it is desirable for the temperature to be substantially in the range from 155° F. to 195° F.

The pump P' is then shut down and the valves V1 in the fluid circulation conduit 38 are closed. Thereafter, valves V3 communicating with the air inlet conduits 25 are open to permit air to be pumped under pressure into the vessel until the pressure or pounds per square inch in the vessel reaches a desired level. As an example, in the use of rice, it is desirable for the air pressure to reach around 80 pounds per square inch.

Thereafter, the valves V3 in the air circulation conduit 25 are closed and the valves V in the water circulation conduit 32 are opened and the pump P started to circulate the water under pressure in the direction of the arrow 51 through the conduit 32, the grain inlet conduit 20, through the vessel 11 and outwardly through the outlet grain conduit 40 into the conduit 32. This circulation of water or fluid in a uniform manner through the vessel enables the grain to become homogenous in character and thus become a solid substance. This, of course, means that when the grain is milled, the grain will not break up, crack or snap, and, of course, will handle much better. Also this process enables larvae, insects and the like to be killed and also cuts infestation of the grain.

After circulation, the lower valve V1 in fluid circulation conduit 38 is opened and valve V2 in the conduit 50 is opened to drain the water or fluid out of the steeping tank. When such valve V2 is opened in the conduit 50, it also simultaneously releases pressure on the system. After the air pressure and fluid have been drained from the system, the grain product is then removed outwardly through the outlet grain conduit by opening the closure means 41 for removal of the grain product.

The foregoing disclosure and description of the invention are illustrative and explanatory thereof, and various changes in the size, shape, and materials as well as in the details of the illustrated construction may be made without departing from the spirit of the invention.

I claim:
1. A process for treating grain comprising the steps of:
   a. filling a container or vessel full of the grain;
   b. filling the vessel or container full of fluid;
   c. simultaneously circulating the fluid through the vessel and heating the fluid until the temperature in the vessel has reached a predesignated level;
   d. closing of the vessel from the circulating fluid;
   e. injecting air under pressure into the vessel until the air pressure reaches a desired level;
   f. circulating the fluid under pressure through the vessel and grain; and
   g. removing the fluid and releasing the air pressure from the vessel when the grain therein is a homogenous mass capable of being easily handled.

2. The steps as set forth in claim 1 including the step of removing the grain from the vessel.

* * * * *